July 12, 1966 NOBUTOSHI KIHARA 3,260,853

SIGNAL CHARGE-OVER DEVICE

Filed Oct. 11, 1960 2 Sheets-Sheet 1

Inventor
Nobutoshi Kihara by Hill, Sherman, Meroni, Gross & Simpson Attys.

July 12, 1966 NOBUTOSHI KIHARA 3,260,853

SIGNAL CHARGE-OVER DEVICE

Filed Oct. 11, 1960 2 Sheets-Sheet 2

Inventor
Nobutoshi Kihara by Hill, Sherman, Meroni, Gross & Simpson Attys.

United States Patent Office 3,260,853

Patented July 12, 1966

3,260,853

SIGNAL CHANGE-OVER DEVICE

Nobutoshi Kihara, Tokyo, Japan, assignor to Sony Corporation, a corporation of Japan Filed Oct. 11, 1960, Ser. No. 61,940
Claims priority, application Japan, Oct. 15, 1959, 34/32,383
6 Claims. (Cl. 307—88.5)

This invention relates to a signal change-over device, and more particularly, to such a device which is especially suited for selecting and passing a plurality of signals received on different lines from a group of signal sources.

One object of this invention is to provide a transistorized signal change-over device which is compact, light and simple in construction, and reliable in operation.

Another object of this invention is to provide a novel change-over device which is particularly suited for use with a magnetic tape recorder of video signals.

Another object of this invention is to provide a novel change-over device in which a single continuous output signal is formed by combining a plurality of input video signals which are separately produced by a plurality of magnetic heads cooperating with one another without a drop-out or overlap at the boundary line between the individual signals.

Further objects, features and advantages of this invention will be more fully understood from the following detailed description taken in connection with the accompanying figures of the drawings in which.

While a signal change-over device constructed in accordance with this invention can be employed in numerous environments, it will be described in its application to video signal recording and reproducing apparatus. A device for reproducing video signals recorded on a magnetic medium such as tape usually includes four magnetic heads which are symmetrically fastened to a revolving disc. The disc is so positioned that the magnetic heads wipe across the magnetic medium whereby a plurality of time divided signals are obtained.

Referring to FIGURES 1 and 2, 1*a*, 1*b*, 1*c* and 1*d* are signal input terminals which receive outputs from four magnetic reproducing heads H*a*, H*b*, H*c* and H*d* respectively. The outputs from the four magnetic heads are represented by the signals 2*a*, 2*b*, 2*c* and 2*d*.

Figure 1:
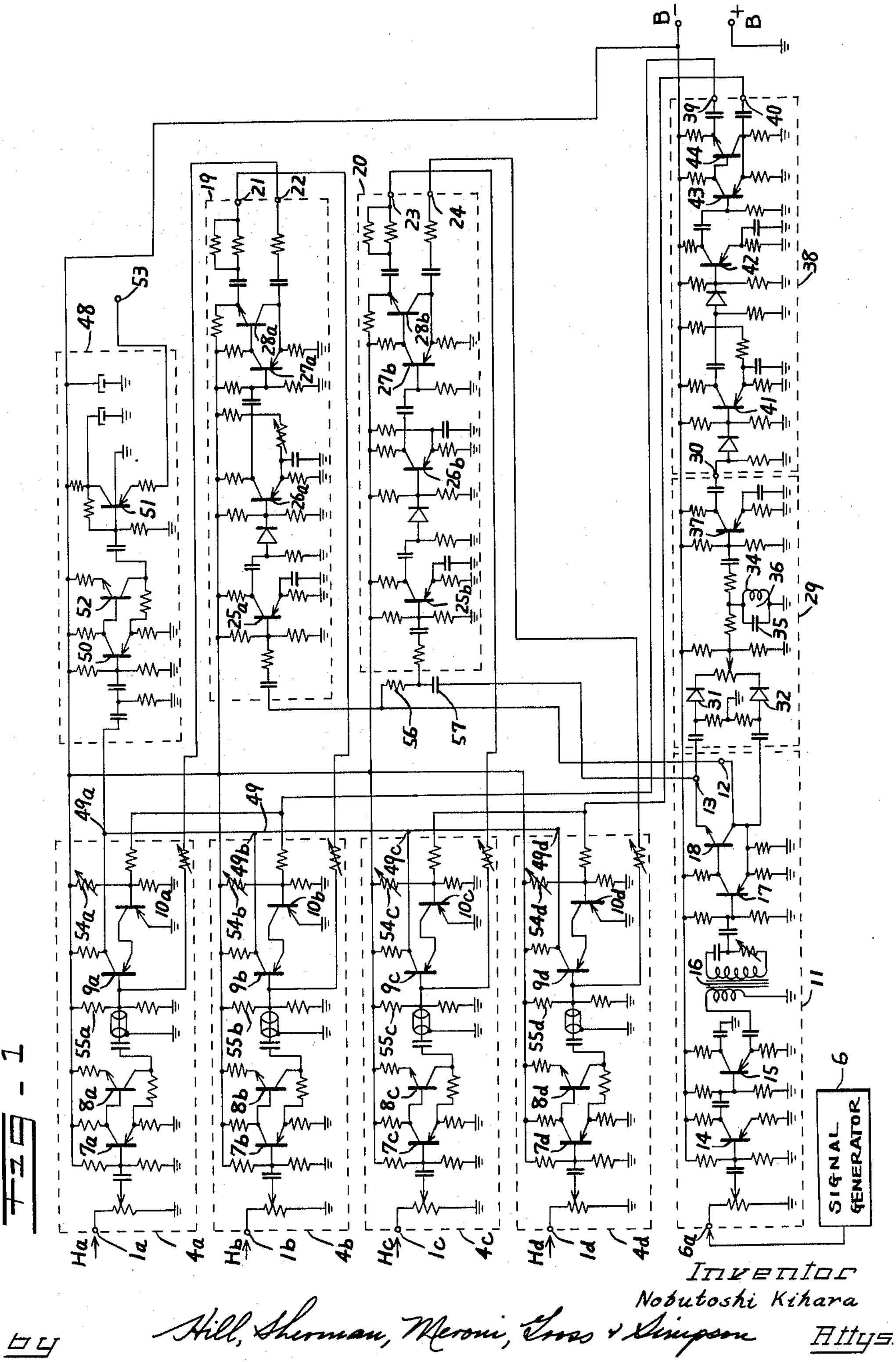
FIGURE 1 is a schematic illustration of a signal change-over device constructed in accordance with this invention.
Figure 2:
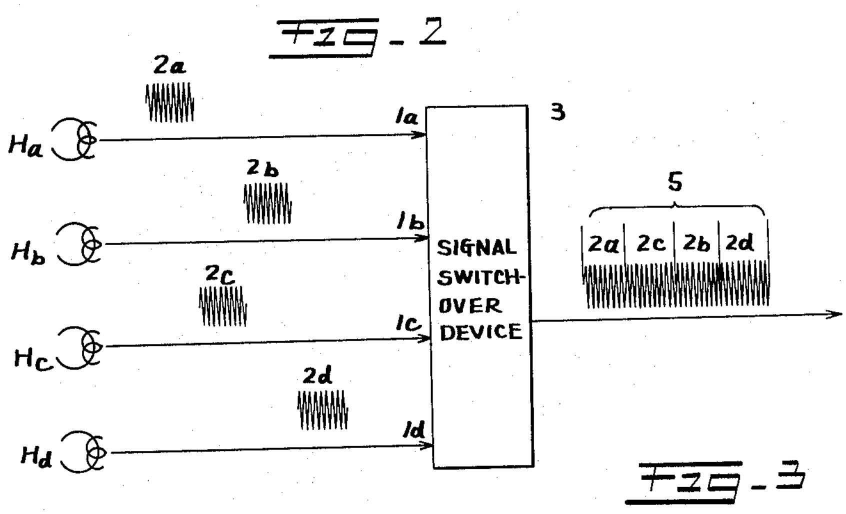
FIGURE 2 is a schematic diagram of an apparatus for reproducing video signals recorded on a magnetic tape.

In accordance with this invention these signals are fed into a switch-over device 3 which combines these signals into a single continuous signal 5 at the output terminal of this device. It will be noted that unless precautions are taken there is a possibility that the individual signals will overlap each other when they are combined because of the construction of the magnetic heads on the disc. To avoid this possibility, gate or time selection circuits 4*a*, 4*b*, 4*c* and 4*d* in the device 3, shown in detail in FIGURE 1, are connected to the terminals 1*a*, 1*b*, 1*c* and 1*d*. In order to switch the gate circuits on and off in the proper sequence, rectangular waveform voltages are produced by suitable means and applied to these four gate circuits. In the case of conventional video signal reproducers using a magnetic disc, a voltage at a frequency of 240 c.p.s. which is synchronized with the rotating disc is appropriate. Four gate signals at 240 c.p.s. and phase angles of 0°, 180°, 90° and 270° are obtained by means of circuits hereinafter described. Furthermore, a 240 c.p.s. signal multiplied to 480 c.p.s. is shifted in phase to form two pairs of rectangular waveform gate signals at phase angles of 0° and 180°. Thus, the gate circuits 4*a*, 4*b*, 4*c* and 4*d* are controlled by these gate signals so that they pass the individual video signals from the magnetic heads in the proper sequency and cause them to form a single continuous video signal.

The four gate circuits 4*a*, 4*b*, 4*c* and 4*d* are identical, so only the circuit 4*a* will be described. It includes a two stage amplifier that has a PNP type transistor 7*a*, an NPN type transistor 8*a*, a PNP type transistor 9*a* which is connected to the 240 c.p.s. gate signals, and a PNP type transistor 10*a* which is connected to the 480 c.p.s. gate signals.

A conventional signal generator 6 produces a 240 c.p.s. voltage having a rectangular waveform. This voltage is synchronized with the rotating disc and is connected to the input 6*a* of a phase splitting circuit 11. This phase splitting circuit includes PNP type transistors 14 and 15, a phase modulation transformer 16 connected to the output of these transistors, a PNP type transistor 17, and a phase splitting NPN type transistor 18. The collector and emitter electrodes of the transistor 18 are connected to the circuit's output terminals 12 and 13, respectively, which provide two rectangular wave voltage signals at 240 c.p.s. with a phase difference of 180° between them.

The two output signals from the terminals 12 and 13 are changed to two signals having phase angles of 0° and 90° by a phase shifting network that includes a capacitor 57, and a resistor 56. The outputs from this network are fed to two phase splitters 19 and 20 which have output terminals 21, 22, 23, and 24. It can be seen that four gate signals at 240 c.p.s. and phase angles of 0°, 180°, 90° and 270° are obtained from these four output terminals. The phase splitting circuits 19 and 20 are identical, so only the circuit 19 will be described. It has an amplifier that includes PNP type transistors 25*a*, 26*a*, and 27*a* and a phase splitting NPN type transistor 28*a* at the last stage. The emitter and collector electrodes of the transistor 28*a* are connected to the output terminals of the circuit.

A portion of the 240 c.p.s. output of the phase splitting circuit 11 is fed to a frequency multiplying circuit 29 which provides a voltage at the multiplied frequency of 480 c.p.s. at its output terminal 30. The frequency multiplying circuit 29 includes a tank circuit 36 which has an inductance coil 34 and a capacitor 35, and a PNP type transistor 37.

The 480 c.p.s. signal obtained at the output terminal 30 is fed to a phase splitting circuit 38 which produces two gate signals that differ in phase by 180°. The phase splitting circuit 38 includes PNP type transistors 41, 42 and 43 and a phase splitting NPN type transistor 44. The emitter and collector electrodes of the transistor 44 are connected to output terminals 39 and 40, respectively, from which the two 480 c.p.s. signals are obtained.

The train of 240 c.p.s. signals from the terminal 21 is connected to the gate circuit 4*b*, the train from the terminal 22 is connected to the gate circuit 4*a*, the train from the terminal 23 is connected to the gate circuit 4*c*, and the train from the terminal 24 is connected to the gate circuit 4*d*.

The train of 480 c.p.s. signals from the terminal 39 is connected to the gate circuits 4*a* and 4*b* and the train of signals from the terminal 40 is connected to the gate circuits 4*c* and 4*d*.

Figures 3, 4:
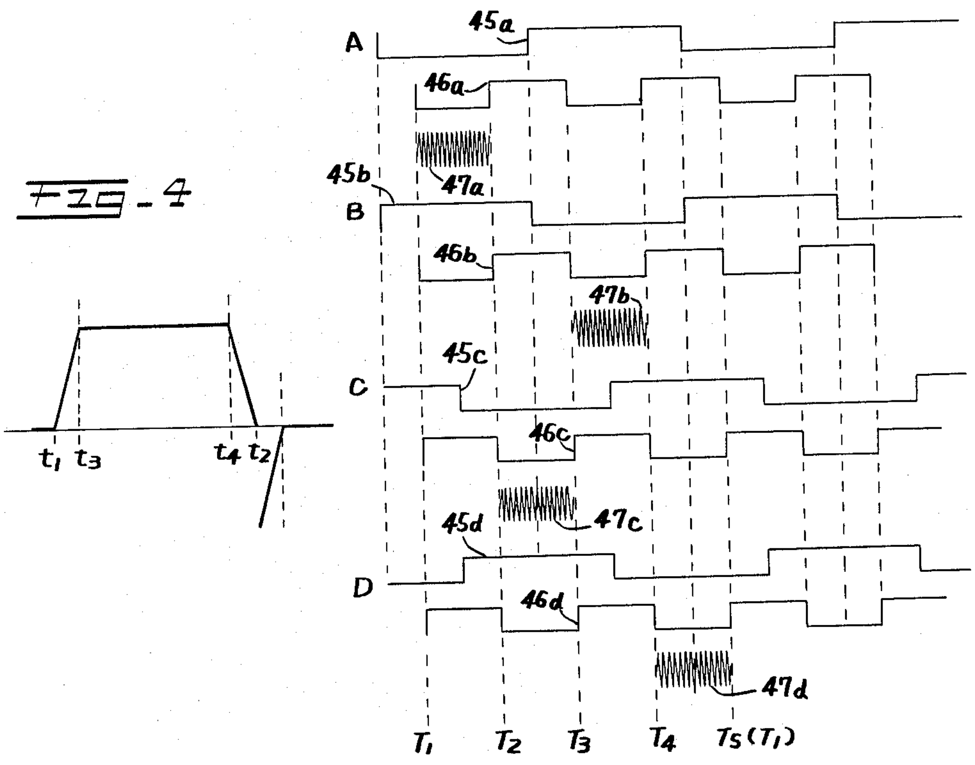
FIGURE 3 is a schedule of waveforms illustrating the operation of the device shown in FIGURE 1.
FIGURE 4 is a waveform illustrating the switching operation in greater detail.

As a result of these connections, gate signals 45*a*, FIGURE 3, at 240 c.p.s. and 46*a* at 480 c.p.s. from the terminals 22 and 39 are added to the first gate circuit 4*a* in the time sequence illustrated. The 480 c.p.s. signal from the frequency multiplying part of the circuit 29 is displaced in phase by 90° by means of the tank circuit 36. Accordingly it will be resulted that the phase angle of 270° of the gate signal 46a at 480 c.p.s. from the terminal 39 will correspond to the 180° phase angle of signal 45a at 240 c.p.s. from the terminal 22. The gate circuit 4a is gated by these two signals during the time interval $T_1$–$T_2$, which corresponds to the period during which the video signal from the first magnetic head Ha is received. In the same manner, a gate signal 45b at 240 c.p.s. from the terminal 39 which is 180° out of phase with the gate signal 45a, and a gate signal 46b, which is identical with the gate signal 46a are fed to the second gate circuit 4b, which causes this gate circuit to be gated during the time interval $T_3$–$T_4$.

The third gate circuit 4c is similarly gated during the time interval $T_2$–$T_3$ and the fourth gate circuit 4d is gated during the time interval $T_4$–$T_5$ in the same manner. 47a, 47b, 47c and 47d in FIGURE 3 show the periods during which these circuits are gated.

It can be seen that the four gate circuits 4a–4d will be alternately gated for the time intervals during which the video signals from the heads Ha–Hd appear. The video signals pass through these gate circuits and appear as a single continuous signal on a common output line 49 which is connected to the outputs terminals 49a, 49b, 49c and 49d.

A conventional video amplifying circuit 48 is connected to the common line 49. The amplifying circuit 48 includes a PNP type transistor 50, a PNP tetrode transistor 51, and an NPN type transistor 52. The output signals from the system are taken off of an output terminal 53 which is connected to the emitter electrode of the transistor 51.

In the gate circuits 4a, 4b, 4c and 4d, the 480 c.p.s. gate signals are so added to the transistors 10a to 10d as to gate these transistors, and the 240 c.p.s. gate signal is also delivered to gate the next stage transistors 9a and 9d. By properly timing these gate signals the successive gate periods 47a, 47b, 47c and 47d are obtained in the order shown in FIGURE 3.

The emitter electrodes of the transistors 9a to 9d are connected to the collector electrodes of the transistors 10a to 10d in order to construct grounded emitter configurations for the transistors 10a to 10d.

Ideally, the above mentioned gating operation is practiced with exactly rectangular gate signals, but in fact it is difficult to obtain such signals. Actually, the rising part of a gate signal is inclined with respect to a vertical line and the falling part is reversely inclined as is illustrated by the waveform in FIGURE 4. Even if it is desired to open a gate circuit during the time period $T_1$–$T_2$, the gating operation will start at a value greater than zero on the rising part of the gate signal within the period $t_1$–$t_3$, and stop at substantially the same value on the falling part of the signal within the period $t_4$–$t_2$. Similar gating operations will be performed in connection with all of the gate circuits.

Accordingly, a gap or drop-out will occur between the adjacent signals when they are combined into a single signal. If adjustments are made to eliminate this gap or drop-out there is also a danger that the gate signals will overlap or be superposed.

To overcome these difficulties, four variable resistors 54a to 54d are connected between the base electrodes of the transistors 10a to 10d and the B— bias source. Then the bias voltage on the transistors 10a to 10d can be properly adjusted by these resistors and the transistors will be gated at the desired times in the periods $t_1$–$t_3$ and $t_2$–$t_4$. Consequently there is no danger that overlapping or dropout portions of the output signals will be observed on the screen of a Braun or cathode-ray tube because the resistors 54a to 54d can be adjusted until they are eliminated or nonobservable. The fixed resistors 55a to 55d can be replaced by variable resistors in order to vary the base bias voltage on the transistors 9a to 9d if desired to obtain more accurate adjustment, but the variable resistors 54a to 54d are usually sufficient.

As above described, this invention has appreciable advantages in that a single resultant signal can be obtained through a plurality of gate circuits in which the widths of the gate signals can, in effect, be adjusted by variable resistors so that gate signals not having a sharp rectangular waveform are not required.

It will be noted that all of the circuits are transistorized, which is advantageous because the device can be made compact and simple and consumes little electric power.

While the description has been given in connection with an apparatus for a video signal magnetic tape recorder, it is obvious that this apparatus can equally well be applied to any system in which a single resultant signal is required from a plurality of signals.

As previously stated, the gate signals have to be synchronized with the incoming signals to the change-over device 3. In the case of a video signal reproducing apparatus, this can be accomplished by attaching the signal source 6 to the rotating disc. For example, the disc can be made to open and close a switch to an electric potential source during a portion of each revolution.

It will be understood that many modifications and variations may be effected without departing from the scope of the novel concepts of this invention.

What is claimed is:

1. A signal change-over device comprising a plurality of gate circuits, a first phase splitting circuit adapted to receive a signal having a predetermined frequency, a frequency multiplying circuit connected to the output of said first phase splitting circuit for producing a multiplied frequency signal, a second phase splitting circuit connected to the output of said frequency multiplying circuit for producing two out-of-phase components at said multiplied frequency, said plurality of gate circuits being transistorized, one of said transistors in each of said gate circuits being biased through a variable resistor, and the outputs of said first and second phase splitting circuits being connected to said plurality of gate circuits in such a manner that said plurality of gate circuits are alternately gated by pairs of signals at said predetermined frequency and said multiplied frequency.

2. A signal change-over device comprising a plurality of gate circuits, a first phase splitting circuit adapted to receive a signal at a predetermined frequency and split said predetermined frequency signal to first and second gate signals at said predetermined frequency which are inversely polarized, a phase shifting circuit connected to the output of said first phase splitting circuit for shifting the phase of said first gate signal, a second phase splitting circuit connected to the output of said first phase splitting circuit and a third phase splitting circuit connected to the output of said phase shifter, said second phase splitting circuit being adapted to provide third and fourth inversely polarized gate signals at said predetermined frequency and said third phase splitting circuit being adapted to provide fifth and sixth inversely polarized signals at said predetermined frequency, a frequency multiplying circuit connected to the output of said first phase splitting circuit for producing a multiplied frequency signal, a fourth phase splitting circuit connected to the output of said frequency multiplying circuit for producing seventh and eighth inversely polarized gate signals at said multiplied frequency, the outputs of said second phase splitting circuit, said third phase splitting circuit and said fourth phase splitting circuit being connected to the inputs of said plurality of gate circuits in such a manner that said plurality of gate circuits are alternately gated by pairs of signals, each of said pairs of signals including a signal at said predetermined frequency and a signal at said multiplied frequency.

3. A signal change-over device comprising four gate circuits, a first phase splitting circuit adapted to receive a signal at a predetermined frequency and provide first and second inversely polarized gate signals, a phase shifter for shifting the phase of said first gate signal, a second phase splitting circuit connected to the output of said first phase splitting circuit and adapted to provide third and fourth inversely polarized gate signals, a third phase splitting circuit connected to the output of said phase shifter for providing fifth and sixth inversely polarized gate signals, a frequency multiplying circuit connected to the output of said first phase splitting circuit for producing a multiplied frequency signal, a fourth phase splitting circuit connected to the output of said frequency multiplying circuit for producing seventh and eighth inversely polarized gate signals, said gate circuits being transistorized, one of said transistors in each of said gate circuits being biased through a variable resistor, the outputs of said second phase splitting circuit, said third phase splitting circuit, and said fourth phase splitting circuit being connected to the input of said four gate circuits in such a manner that said gate circuits are alternately gated by a pair of gate signals, each of said pair of gate signals including a signal at said predetermined frequency and a signal at said multiplied frequency.

4. A signal change-over device comprising four gate circuits adapted to receive signals from different sources, a first phase splitting circuit adapted to receive a signal at a predetermined frequency and produce first and second inversely polarized gate signals, a phase shifter connected to the output of said first phase splitting circuit and adapted to shift the phase of said first gate signal by an angle of 90°, a second phase splitting circuit connected to the output of said first phase splitting circuit for producing third and fourth inversely polarized signals, a third phase splitting circuit connected to the output of said phase shifter for producing fifth and sixth inversely polarized gate signals, a frequency multiplying circuit connected to the output of said first phase splitting circuit for producing a multiplied frequency signal, a fourth phase splitting circuit connected to the output of said frequency multiplying circuit for producing seventh and eighth inversely polarized gate signals at said multiplied frequency, one of said gate circuits being connected to the outputs of said second and fourth phase splitting circuits, a second one of said gate circuits being connected to the outputs of said second and fourth phase splitting circuits, a third one of said gate circuits being connected to the outputs of said third and fourth phase splitting circuits, and a fourth one of said gate circuits being connected to the outputs of said third and fourth gate splitting circuits, said four gate circuits being adapted to be alternately gated by the concurrent presence of two of said gate signals, all of said circuits being transistorized, one of said transistors in each of said gate circuits being biased through a variable resistor.

5. In a signal switching circuit, means for producing at a certain frequency first and second gating signals in phase opposition, means for producing at said certain frequency third and fourth gating signals in phase opposition and shifted in phase relative to said first and second signals through an angle on the order of 90°, means for producing at a frequency twice said certain frequency fifth and sixth gating signals in phase opposition and in phase-displaced relation to said first, second, third and fourth signals, a first gate circuit responsive to said first and fifth gating signals, a second gate circuit responsive to said third and sixth gating signals, a third gate circuit responsive to said second and fifth gating signals, and a fourth gate circuit responsive to said fourth and sixth gating signals.

6. In a signal switching circuit, means for producing at a certain frequency first and second gating signals in phase opposition, means for producing at said certain frequency third and fourth gating signals in phase opposition and shifted in phase relative to said first and second signals through an angle on the order of 90°, means including frequency multiplying means for producing at a frequency twice said certain frequency fifth and sixth gating signals in phase opposition and in phase-displaced relation to said first, second, third and fourth signals, a first gate circuit responsive to said first and fifth gating signals, a second gate circuit responsive to said third and sixth gating signals, a third gate circuit responsive to said second and fifth gating signals, and a fourth gate circuit responsive to said fourth and sixth gating signals.

References Cited by the Examiner

UNITED STATES PATENTS

| | | | |
|---|---|---|---|
| 2,698,382 | 12/1954 | Uglow et al. | 328—104 |
| 2,802,941 | 8/1957 | McConnell | 328—206 |
| 2,881,320 | 4/1959 | Goldberg | 307—88.5 |
| 3,041,586 | 6/1962 | Wilson et al. | 328—67 X |

OTHER REFERENCES

Millman and Taub, Pulse and Digital Circuits, pages 146–147, 152, McGraw-Hill Book Co., N.Y., 1956.

Chance et al., Waveforms, pages 164–166, McGraw-Hill Book Co., Inc., N.Y., 1949.

JOHN W. HUCKERT, *Primary Examiner.*

ARTHUR GAUSS, GEORGE WESTBY, *Examiners.*

J. D. CRAIG, A. S. KATZ, E. DREYFUS, *Assistant Examiners.*